(12) United States Patent
Zhang et al.

(10) Patent No.: US 9,586,306 B2
(45) Date of Patent: Mar. 7, 2017

(54) METHOD AND APPARATUS FOR MONITORING PARTICLE LADEN PNEUMATIC ABRASIVE FLOW IN AN ABRASIVE FLUID JET CUTTING SYSTEM

(71) Applicant: OMAX Corporation, Kent, WA (US)

(72) Inventors: Shijin Zhang, Chongqing (CN); Scott Veenhuizen, Covington, WA (US); Axel Henning, Black Diamond, WA (US)

(73) Assignee: OMAX Corporation, Kent, WA (US)

( * ) Notice: Subject to any disclaimer, the term of this patent is extended or adjusted under 35 U.S.C. 154(b) by 743 days.

(21) Appl. No.: 13/645,933

(22) Filed: Oct. 5, 2012

(65) Prior Publication Data

US 2014/0045409 A1   Feb. 13, 2014

Related U.S. Application Data

(60) Provisional application No. 61/682,665, filed on Aug. 13, 2012.

(51) Int. Cl.
| | | |
|---|---|---|
| *B24C 1/00* | (2006.01) | |
| *B24C 7/00* | (2006.01) | |
| *B65G 53/66* | (2006.01) | |
| *G01F 1/34* | (2006.01) | |
| *G01F 1/74* | (2006.01) | |
| *G01F 15/00* | (2006.01) | |
| *G01F 22/00* | (2006.01) | |

(52) U.S. Cl.
CPC ............ *B24C 7/0046* (2013.01); *B65G 53/66* (2013.01); *G01F 1/34* (2013.01); *G01F 1/74* (2013.01); *G01F 15/003* (2013.01); *G01F 22/00* (2013.01)

(58) Field of Classification Search
CPC ... B24C 1/00; B24C 7/00; B24C 7/0046; B24C 7/0053; B24C 7/0061; B24C 7/0069; B65G 53/66; G01F 1/34; G01F 1/74; G01F 15/003
USPC .................... 451/2, 5, 8, 36, 38, 75, 99, 102
See application file for complete search history.

(56) References Cited

U.S. PATENT DOCUMENTS

| | | |
|---|---|---|
| 3,073,070 A | 1/1963 | Mead |
| 3,413,794 A * | 12/1968 | Bell et al. ......................... 57/80 |
| 3,543,444 A | 12/1970 | Mehta |
| 3,834,082 A | 9/1974 | Grudzinski |
| 4,075,789 A | 2/1978 | Dremann |
| 4,125,969 A | 11/1978 | Easton |

(Continued)

FOREIGN PATENT DOCUMENTS

GB    2198975 A    6/1988

OTHER PUBLICATIONS

U.S. Appl. No. 13/436,354, filed Mar. 30, 2012, Schubert et al.

(Continued)

*Primary Examiner* — Monica Carter
*Assistant Examiner* — Lauren Beronja
(74) *Attorney, Agent, or Firm* — Perkins Coie LLP

(57) ABSTRACT

An abrasive jet cutting system may include a differential pressure measurement apparatus configured to measure a differential pressure between points in an abrasive supply system. The differential pressure may be used to determine one or more conditions of the jet and the abrasive delivery. The measured differential pressure may be used in a feedback control system, feed forward control system, and/or an alarm or safety system.

51 Claims, 6 Drawing Sheets

(56) References Cited

U.S. PATENT DOCUMENTS

| | | |
|---|---|---|
| 4,253,610 A | 3/1981 | Larkin |
| 4,478,368 A | 10/1984 | Yie |
| 4,802,312 A | 2/1989 | Glaeser et al. |
| 4,817,342 A | 4/1989 | Martin et al. |
| 4,878,320 A | 11/1989 | Woodson |
| 4,984,397 A | 1/1991 | Van Leeuwen |
| 5,098,229 A | 3/1992 | Meier et al. |
| 5,107,630 A | 4/1992 | Lodewijk |
| 5,176,018 A | 1/1993 | Thompson |
| 5,407,379 A * | 4/1995 | Shank .................. B24C 7/0053 451/101 |
| 5,441,441 A | 8/1995 | Cook et al. |
| 5,468,066 A | 11/1995 | Hammonds |
| 5,591,064 A * | 1/1997 | Spears, Jr. ........................ 451/2 |
| 5,643,058 A | 7/1997 | Erichsen et al. |
| 5,800,246 A | 9/1998 | Tomioka |
| 5,876,267 A | 3/1999 | Kanda |
| 6,083,001 A * | 7/2000 | Deardon et al. ................ 433/88 |
| 6,098,677 A | 8/2000 | Wegman et al. |
| 6,200,203 B1 | 3/2001 | Xu et al. |
| 6,227,768 B1 | 5/2001 | Higuchi et al. |
| 6,425,804 B1 | 7/2002 | Pettit et al. |
| 6,676,039 B2 | 1/2004 | Lindsey et al. |
| 6,970,793 B2 * | 11/2005 | Pearson et al. ................. 702/64 |
| 7,040,959 B1 | 5/2006 | Panuska et al. |
| 7,465,215 B2 | 12/2008 | Shimizu et al. |
| 8,123,591 B2 | 2/2012 | Olsen |
| 8,308,525 B2 | 11/2012 | Hashish et al. |
| 8,342,912 B2 | 1/2013 | Funatsu et al. |
| 2003/0166378 A1 * | 9/2003 | Fuksshimov et al. ............ 451/8 |
| 2004/0132383 A1 * | 7/2004 | Langford et al. ............... 451/38 |
| 2005/0017091 A1 | 1/2005 | Olsen et al. |
| 2005/0070205 A1 * | 3/2005 | Korovin et al. .................. 451/5 |
| 2005/0239371 A1 * | 10/2005 | Togawa ............................ 451/5 |
| 2012/0021676 A1 * | 1/2012 | Schubert et al. ............... 451/38 |
| 2012/0156969 A1 | 6/2012 | Liu |
| 2012/0196516 A1 | 8/2012 | Funatsu et al. |
| 2012/0252325 A1 | 10/2012 | Schubert et al. |
| 2012/0252326 A1 * | 10/2012 | Schubert et al. ............... 451/60 |
| 2013/0005225 A1 | 1/2013 | Russo |
| 2013/0267152 A1 | 10/2013 | Tera et al. |

OTHER PUBLICATIONS

U.S. Appl. No. 13/436,459, filed Mar. 30, 2012, Schubert et al.
Operation Manual, Abrasive Delivery System, TYPE ADS-24-II, © Flow Europe GmbH Jul. 2000, 28 pages.

* cited by examiner

METHOD AND APPARATUS FOR MONITORING PARTICLE LADEN PNEUMATIC ABRASIVE FLOW IN AN ABRASIVE FLUID JET CUTTING SYSTEM

CROSS REFERENCE TO RELATED APPLICATION

The present application claims the benefit of and priority under 35 U.S.C. §119(e) to U.S. Provisional Patent Application Ser. No. 61/682,665, entitled "METHOD AND APPARATUS FOR MONITORING PARTICLE LADEN PNEUMATIC ABRASIVE FLOW IN AN ABRASIVE FLUID JET CUTTING SYSTEM," filed Aug. 13, 2012, assigned to the same assignee as the present application and which is incorporated herein by reference in its entirety.

BACKGROUND

Pneumatic conveyance of particles is used in a wide range of processes worldwide. One process that uses pneumatic conveyance of particles is associated with abrasive fluid jet systems, which may be used in production cutting applications. Abrasive fluid jets are used to cut, drill holes through, or machine relatively hard materials such as glass, stone, and metals. Abrasive fluid jet cutting generally operates using a high speed jet of fluid to project abrasive particles to erode a workpiece. The high speed fluid jet is generated by using a high pressure pump to deliver high pressure fluid to a nozzle, where the high pressure is converted to a high velocity fluid jet. The vacuum of the jet is used to convey abrasive particles such as garnet to the cutting head where they are accelerated by the fluid jet in a mixing tube just downstream from the water orifice.

Abrasive fluid jet systems typically depend on an uninterrupted flow of abrasive particles from an abrasive supply system. If the flow of the abrasive particles is interrupted, cutting failure typically results. Cutting failures may be a reduction of cutting edge quality possibly resulting in failure to separate the workpiece. This may result in loss of a machined part, waste of material, loss of machine time, or other potentially costly and time wasting effects. Therefore, it is desirable to provide a reliable abrasive flow monitoring system.

Unfortunately, many flow sensors suffer from erosion and/or other degradation effects when used to measure a flow including entrained abrasive particles. Other flow sensors are too expensive. Sensors based on measuring an absolute pressure or vacuum in an abrasive delivery system has proven to be susceptible to inaccuracies related to atmospheric pressure changes and/or other factors. Conventional sensing systems associated with pneumatic conveying systems have often failed to meet or only poorly meet needs for stability, durability, accuracy, reliability, and cost. What is needed is a reliable and cost effective method to reliably monitor the abrasive flow that does not suffer from rapid deterioration in a streaming abrasive environment.

SUMMARY

Abrasive particle entrained fluid jets may be used to perform a variety of cutting and milling operations. Abrasive particles may be delivered to a fluid jet via entrainment in air. Maintaining a steady flow of abrasive particles for entrainment into the fluid jet is generally desirable to achieve high quality results. Measuring the flow of abrasive particles in the entrainment air is one aspect of maintaining a steady flow of abrasive particles for entrainment in the fluid jet. The air velocity may be higher than the average velocity of the abrasive particles themselves. The flow of air around the entrained particles results in a pressure drop, also referred to as a change in partial vacuum, arising from differential aerodynamic drag around each of the particles. The sum of aerodynamic drag may be correlated to the number or concentration of particles entrained in the air. The correlation may be determined for a range of operating conditions. A differential pressure or differential partial vacuum between two or more points in an abrasive supply system may be used, optionally in combination with other operating parameters, to determine the condition of particle flow. The differential pressure or partial vacuum may be used in a feedback or feed forward control loop and/or may be used to inform an operator about the operational status of the particle flow and thus the cutting operation.

According to an embodiment, a method for monitoring an abrasive fluid jet cutting system includes providing an abrasive to an abrasive fluid jet nozzle as abrasive particles entrained in air flowing through an abrasive supply tube; and measuring a differential pressure between at least two points along the abrasive supply tube to infer or determine an abrasive flow rate or abrasive flow condition.

According to another embodiment, a particle conveyor includes a particle supply tube configured to pneumatically convey particles from a particle inlet port to a particle outlet port configured to be drawn down to a partial vacuum. The particle supply tube includes at least two measurement ports at different distances along the particle supply tube with no flow constriction between the at least two measurement ports. A differential pressure transducer or two pressure transducers coupled to the at least two measurement ports are configured to measure a differential pneumatic pressure between the at least two measurement ports. A controller operatively coupled to the differential pressure transducer is configured to determine one or more particle flow parameters responsive to the differential pneumatic pressure.

According to another embodiment, a differential pressure measurement fitting for an abrasive jet cutting system includes a wall defining a smooth abrasive flow channel configured for air-entrained abrasive flow and at least two pressure measurement ports arranged at different distances along the abrasive flow channel.

DETAILED DESCRIPTION

Figure 1:
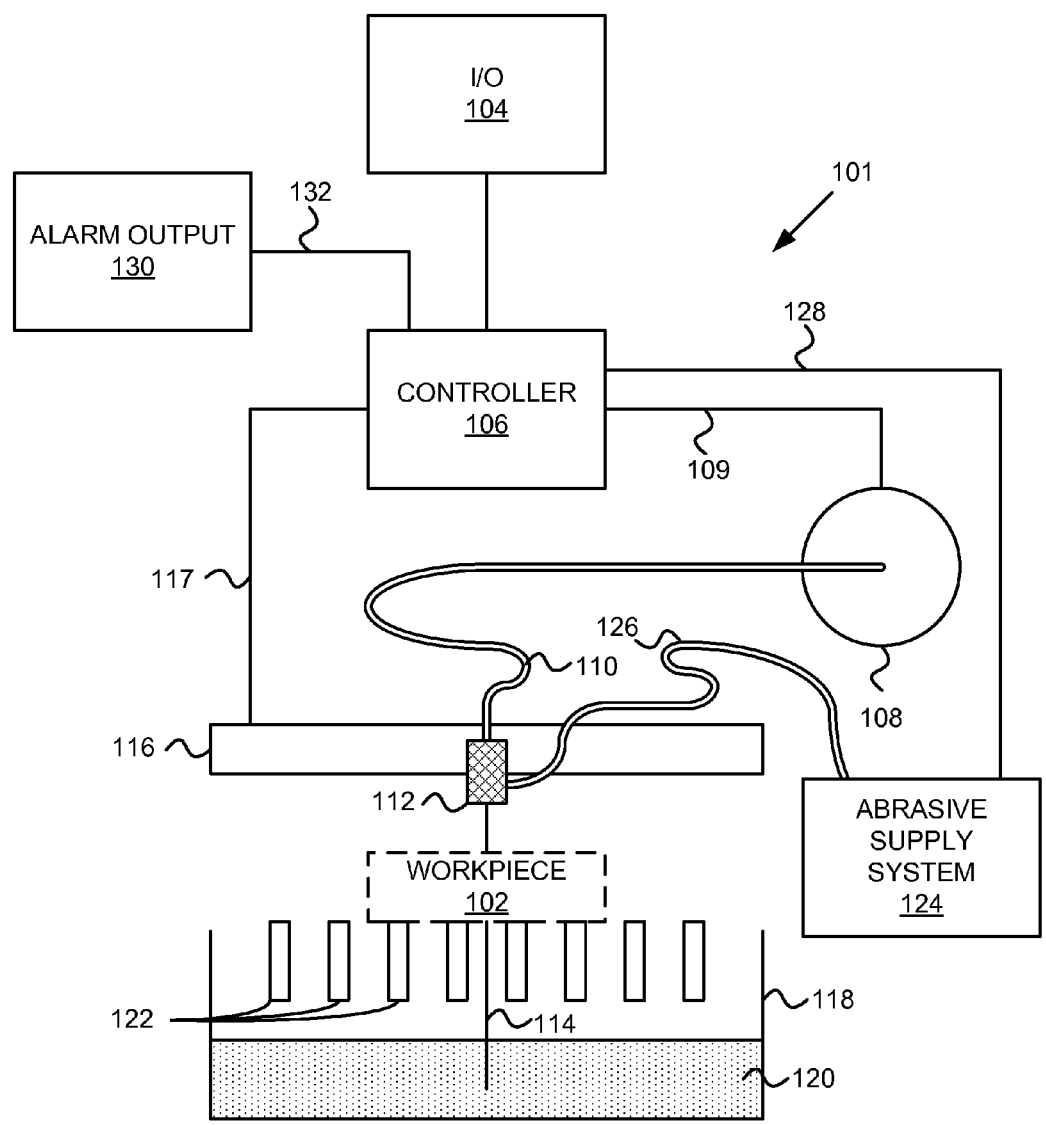
FIG. 1 is a diagram of an abrasive fluid jet system, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a diagram illustrating a fluid jet cutting system 101 configured to cut a workpiece 102, according to an embodiment. A computer interface 104 may be configured to receive computer instructions corresponding to a cutting path through the workpiece 102. A controller 106 may be configured to receive the computer instructions to drive the fluid jet cutting system 101. Alternatively, the cutting path may be produced by nozzle motion and/or workpiece motion driven by a different method, such as by hand guiding, for example.

The controller 106 may be operatively coupled to a high pressure pump 108 via a pump interface 109. The pump 108 may optionally be controlled separately. The high pressure fluid pump 108 is configured to provide high pressure fluid through high pressure tubing 110 to a nozzle 112. The nozzle 112 receives the high pressure fluid and projects a high velocity fluid cutting jet 114.

The controller 106 is operatively coupled to drive an actuation system 116 configured to drive the position of the nozzle 112 via an actuation interface 117. Typically actuation systems 116 include at least X-Y drive. Some actuation systems additionally include Z-axis and tilting axes. The controller 106 drives the actuation system 116 to position the nozzle 112 to scan the fluid jet 114 across the workpiece 102 to make cuts. The workpiece 102 can be supported by a workpiece support system 118 including bed slats 122 over a pool of water 120. Other embodiments can include a fixed cutting head with an actuated workpiece.

A particle supply system 124 may provide abrasive particles such as garnet entrained in air to the nozzle 112 through abrasive particle supply tube 126, and particularly to a mixing tube (not shown). At the mixing tube, the high velocity jet 114 draws a partial vacuum at an outlet port of the abrasive supply tube 126, which creates a pneumatic driving force to drive particles through the abrasive particle supply tube 126. The high velocity jet entrains the air containing the abrasive particles. The abrasive supply system 124 (of which the abrasive supply tube 126 may generally be considered to be a part) includes at least one signal transmission path 128 configured to couple the abrasive supply system 124 to the controller 106. The signal transmission path 128 may be configured to transmit a differential pressure signal from the abrasive supply system 124 to the controller 106.

An optional alarm output 130 may provide an apparatus for alerting a user of one or more operating and/or fault conditions. For example, the alarm output 130 may include a bell, speaker, beeper, buzzer, or other audible output selected to call attention to a fault condition. Alternatively or additionally, the alarm output 130 may include a visible indicator such as a computer display, a gauge, an indicator light, a strobe light or other visible output selected to call attention to a fault condition. The alarm output 130 may also generate or cause to be generated a display or transmission of an electronic message to call attention to a fault condition. The controller 106 may be configured to provide an alarm signal to the alarm output 130 via a signal transmission path 132. Optionally, the interface 104 may provide an interface to an alarm output 130 and a separate signal transmission path 132 may be omitted.

Figure 2:
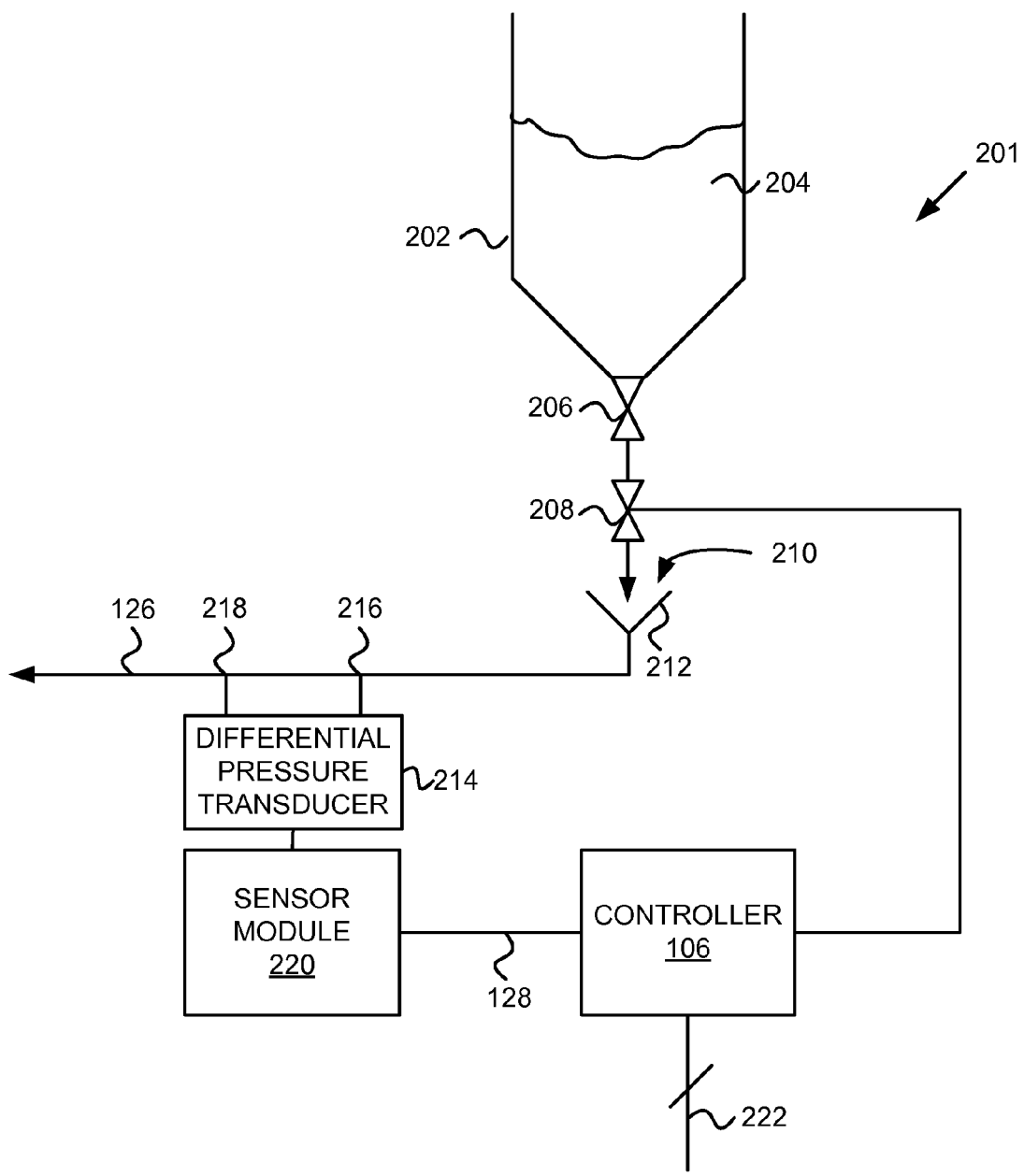
FIG. 2 is a diagram showing a relationship between the abrasive supply system and controller of FIG. 1, according to an embodiment.

FIG. 2 is a block diagram of a subsystem 201 showing a relationship between components of the abrasive supply system 124 and controller 106 of FIG. 1, according to an embodiment. An abrasive hopper 202 may hold abrasive particles 204. The abrasive hopper 202 may, for example, be held substantially at atmospheric pressure, or alternatively may be held under vacuum or at an elevated pressure. Abrasive particles 204 are metered from the abrasive hopper 202 through a metering apparatus or valve 206 that controls the rate of flow. According to an embodiment, the metering apparatus or valve 206 may be a predetermined length of tube at a predetermined diameter that allows a relatively constant rate of abrasive flow; using an effect similar to the neck of an hourglass. Optionally, the metering apparatus or valve 206 may be controlled by the controller 106 through a signal interface (not shown).

The abrasive particles may next flow through an optional shut-off valve 208 that is optionally actuated by the controller 106. According to an embodiment, the abrasive particles 204 fall from the metering apparatus or valve 206 and the optional shut-off valve 208 under gravity through an optional air gap 210 and into an abrasive inlet port 212 that is operatively coupled to the abrasive supply tube 126. An embodiment of the abrasive inlet port 212 is shown in more representative form in FIGS. 4A and 4B.

In alternative embodiments, the abrasive particles 204 may be pulled from the abrasive hopper 202 under gravity, responsive to a screw conveyor, vacuum, pressure, or other abrasive introduction mechanism corresponding to the apparatus 206, 208, 212 between from the abrasive hopper 202 and the abrasive supply tube 126. The controller 106 may control such alternative apparatuses responsive to the measurement of differential pneumatic pressure described herein.

According to an embodiment, the metering apparatus or valve 206 can include a mechanism such as a variable aperture to constrain the passage of abrasive particles. For example, the metering apparatus or valve 206 may include a slide (not shown) configured to vary the size of a gap through which abrasive particles 204 are metered. The shut-off valve 208 may be also be embodied as a slide valve, or may be embodied as a bladder valve, for example. Optionally, the shut off valve 208 may be omitted and on/off functionality may be provided by the metering apparatus or valve 206.

After entering the abrasive supply tube 126 at the abrasive inlet port 212, the abrasive particles are entrained in air moving through the abrasive supply tube 126 and are pneumatically conveyed as entrained particles through the abrasive supply tube 126 to an abrasive outlet port (not shown) that opens into a nozzle mixing tube (not shown).

The air moving through the abrasive particle supply tube 126 moves faster than the particles entrained in the air. This "blows" the particles through the abrasive supply tube 126. Typically, frictional effects of the air moving past and around the abrasive particles causes a pressure drop. A larger amount or concentration of abrasive particles in the abrasive particle supply tube 126 causes a higher pneumatic pressure loss. Thus, the pressure drop through the abrasive supply tube 126 is indicative of the flowing condition and flow rate of the entrained particles.

The pneumatic pressure loss in the abrasive supply tube 126 is measured as a differential pressure between at least two points 216 and 218 along the abrasive supply tube 126. The first point 216 may correspond to a first orifice and the second point 218 may correspond to a second orifice located along the abrasive supply tube 126 between and not including the inlet port 212 or the abrasive outlet port (not shown). According to an embodiment, the first point 216 and the second point 218 may be located along a fitting, as shown below.

A differential pressure transducer 214 is configured to measure the differential pressure between the first 216 and second 218 orifices. Optionally, the differential pressure between the first 216 and second orifices 218 may be measured by a respective first transducer and second transducer (not shown) that each measure an absolute or gauge pressure. The respective absolute or gauge pressures may be converted to a differential pressure by pressure comparison.

In some applications the distance between differential measurement points 216, 218 may be relatively small. According to an embodiment, the measured differential pressure may be substantially attributable to pressure drop created by air flow around entrained abrasive particles. In other applications, the distance between differential measurement points 216, 218 may be large and/or there may be an ell or another fitting between the measurement points 216, 218. According to an embodiment, the differential pressure may correspond to friction losses substantially created by a combination of airflow between the at least two points and airflow around the entrained abrasive particles between the at least two points.

Optionally, a sensor module 220 may receive the differential pressure electrical signal and convert it to data that is transmitted to the controller 106 via the at least one signal transmission path 128. Alternatively, the sensor module 220 may receive first and second absolute or gauge pressure transducer electrical signals and convert them to a differential pressure signal or data that is then transmitted to the controller 106. The differential pressure signal may include a signal and/or data transmitted between the sensor module 220 and the controller 106.

According to an embodiment, the pressure transducer 214 and the sensor module 220 (or optionally an integrated portion of the controller 106) may further be configured to sense an absolute or average gauge pressure in addition to sensing a differential pressure.

The controller 106 may be configured to transmit one or more signals through one or more interfaces 222 responsive to the pressure differential between points 216 and 218. For example the one or more interfaces 222 may include the pump interface 109, the actuation interface 117, the signal transmission path 132 that interfaces with the alarm output 130, or the interface 104 shown in FIG. 1. Thus, the controller 106 may be configured to receive a differential pressure signal from the abrasive supply system 124 and responsively control the supply of fluid to the high pressure nozzle 112, movement of the actuation system 116 for the high pressure nozzle 112, operation of the abrasive supply system 124, providing an alarm from the alarm output 130, and/or other responses or actions.

When the system or subsystem 101, 201 is starting up, differential pressure between points 216, 218 may typically be quite low or otherwise outside a normal operating range. The controller 106 may be configured to ignore the differential pressure during start-up.

During operation, the controller 106 may be configured to respond when the differential pressure signal indicates a decrease in differential pressure below a predetermined value. According to an embodiment, the predetermined value may be determined at least in part responsive to a previously measured differential pressure. For example, changes arising from variations in abrasive particle size, system wear, and other factors may be exhibited and monitored as gradual changes in differential pressure that do not relate to fault conditions. Such gradual changes may be tracked and used to monitor the system condition until a value is reached which may result in a state at which the controller 106 responds with a fault response.

Optionally, the controller 106 may operate at least partially using digital logic, analog logic, and/or fluid logic. In the case of at least a portion of the controller 106 including a fluid logic, the differential pressure transducer 214 (or alternatively the pair of absolute or gauge pressure transducers, not shown) may be omitted and the differential pressure signal transmission path and/or the at least one signal transmission path 128 may include pneumatic or vacuum lines rather than electrical conduction paths, wireless signal transmission paths, etc. In the case of a controller 106 that is at least partially pneumatic, the differential pressure transducer 214 may be replaced by one or more diaphragms or filters configured to separate a "clean" pneumatic controller side from a "dirty" pneumatic conveying gas in the abrasive supply tube 126.

Figure 3:
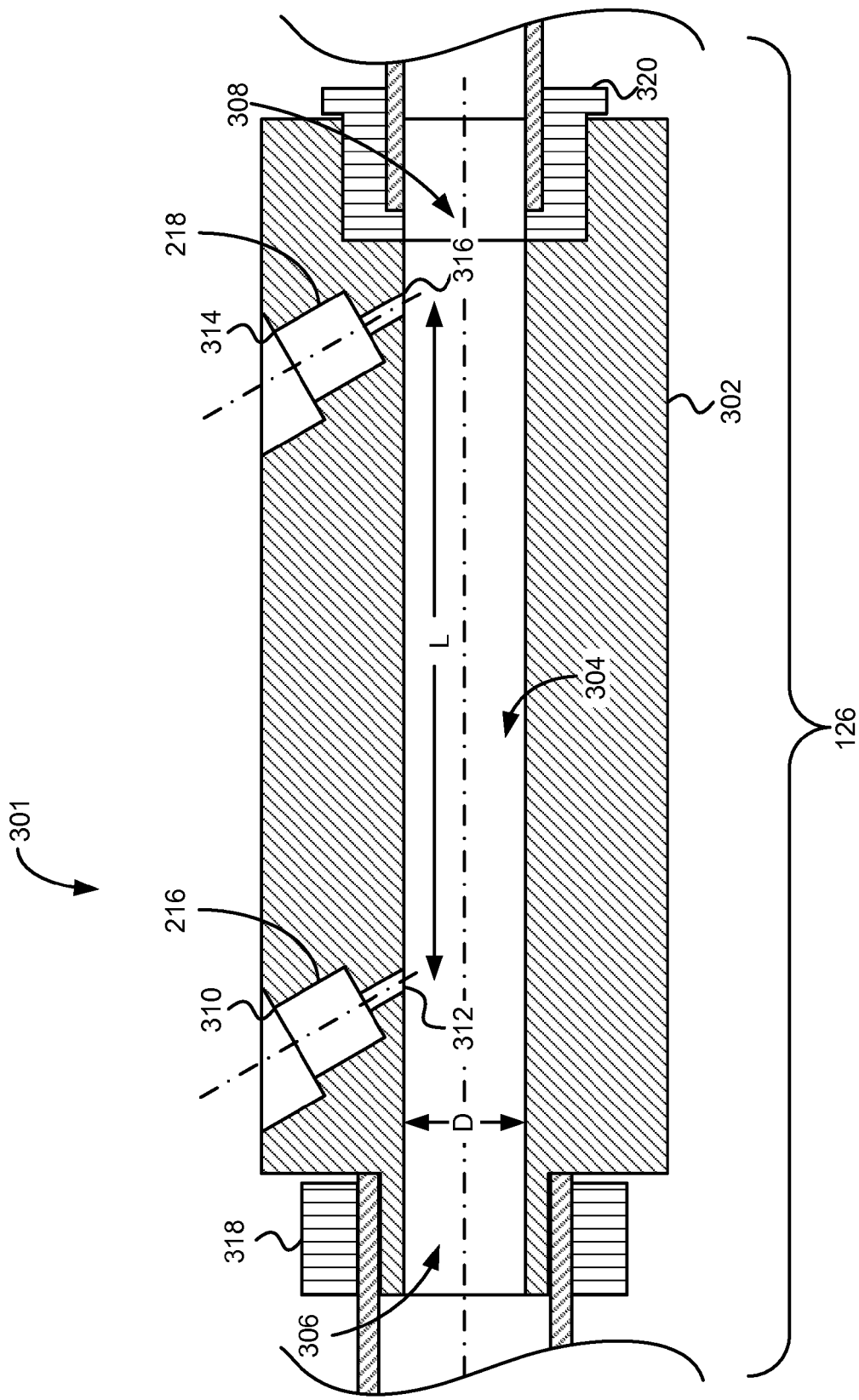
FIG. 3 is a diagram of a portion of the abrasive delivery tube of FIGS. 1 and 2 including a fitting with differential pressure measurement points, according to an embodiment.

FIG. 3 is a side sectional view of a portion 301 of the abrasive supply tube 126 of FIGS. 1 and 2 including the differential pressure points 216, 218, according to an embodiment. The abrasive supply tube 126 may include a fitting 302. The fitting 302 may be referred to as a differential pressure measurement fitting.

The fitting 302 includes walls that define a flow channel 304, having a diameter D, configured to provide a path for the flow of gas with entrained abrasive from a flow channel input 306 to a flow channel output 308. First and second pressure measurement ports 310, 314 may be configured to receive a differential pressure measurement transducer 214 (or alternatively, respective absolute or gauge pressure transducers) shown in block diagram form in FIG. 2. Alternatively or additionally, the pressure measurement ports 310, 314 may be configured to receive pneumatic diaphragms, filters, and/or fittings for coupling to pneumatic signal lines. The first and second measurement ports 310, 314 communicate with the flow channel 304 via respective orifices 312, 316.

At the entrance 306 to the flow channel 304, the fitting 302 includes a first coupling 318 configured couple the abrasive flow channel 304 to receive air-entrained abrasive from an abrasive source, such as the abrasive supply system 124. At the exit 308 from the flow channel 304, the fitting 302 includes a second coupling 320 configured couple the abrasive flow channel to the rest of the abrasive supply tube 126. According to an embodiment, the first pressure measurement point 216 and corresponding orifice 312 are situated at a position far enough away from the input 306 to avoid perturbations in gas and abrasive flow arising from entrance effects.

The first and second orifices 312, 316 are arranged at different positions along the length of the flow channel 304 separated by a distance L. According to an embodiment, the orifices 312, 316 of the pressure measurement ports 310, 314 are configured to have similar or substantially identical flow restriction. The substantially identical flow restriction may provide substantially identical entrance pressure losses for the respective orifices 312, 316.

The differential pressure measured between the pressure measurement ports 310 and 314 correlates with the amount (e.g., the concentration) of particles entrained between the pressure measurement ports 310, 314. The pressure drop is caused by a summation of frictional losses as air flows around each particle. For a system that is operating normally, the number of abrasive particles entrained between the pressure measurement ports 310, 314 at any one time remains substantially constant. Thus, the differential pressure is indicative of the pneumatic air flow condition (e.g., the velocity of air) and the concentration of abrasive particles in the control volume between the measurement ports. It is therefore a measure of the condition of the airstream and the condition of abrasive particle delivery to the nozzle, which may also be indicative of the abrasive flow rate and the condition of the air flow producing venturi system in the cutting head.

Notably, the fitting 302 does not include a conventional pressure drop constriction such as a metering plate or a venturi. In such systems, the pressure drop is a function of the (fixed) geometry of a flow constriction disposed between differential pressure measurement ports. Conventional differential pressure measurement fittings, for example that include a plate with a hole or a venturi through which gas flows, have a fixed geometry and hence a fixed pressure drop. However, such conventional measurement fittings are not suitable to measuring flow of a gas carrying entrained particles because the particles can cause excessive wear on the fitting. In place of a flow constriction such as a plate or venturi, embodiments of the present invention use the presence of the particles themselves to create a restriction for measuring the differential pressure. The gas (air) generally moves significantly faster than the particles. Thus, each particle can be modeled as a stationary sphere with gas moving around it.

Optionally, absolute or gauge pressure may also be measured. Absolute or gauge pressure may be measured as the pressure at one or the other of the points 216, 218. Average (absolute or gauge) pressure may be measured by averaging the pressures measured at both points 216, 218.

Figure 4:
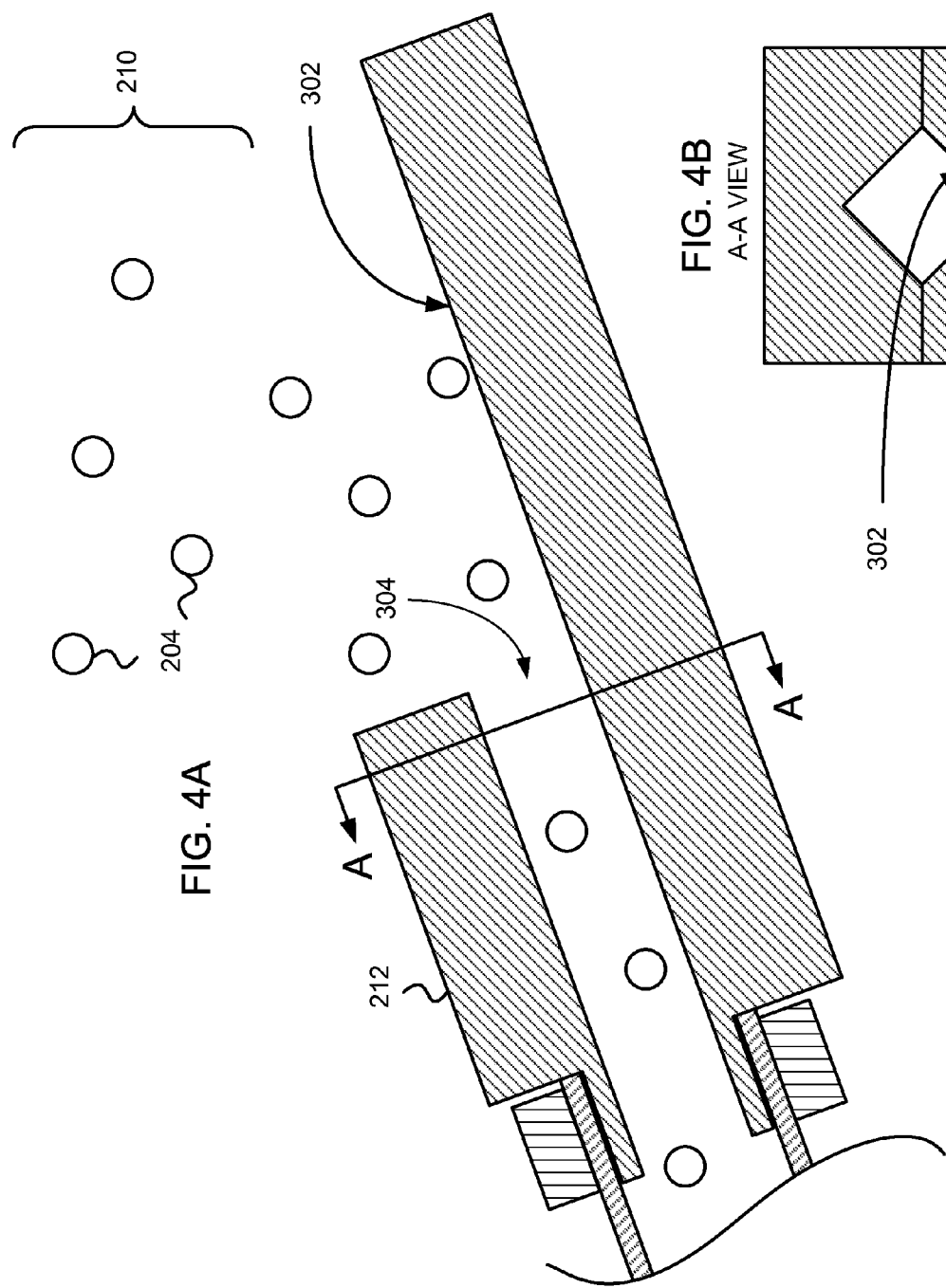
FIG. 4A is a side sectional view of an abrasive inlet port, according to an embodiment.
FIG. 4B is a cross-sectional view of the abrasive inlet port of FIG. 4A, according to an embodiment.

FIG. 4A is a side sectional view of an abrasive particle inlet port 212, according to an embodiment. FIG. 4B is a cross-sectional view of the abrasive inlet port of FIG. 4A, according to an embodiment. With reference to FIG. 2 and FIGS. 4A and 4B, the abrasive particles 204 fall through the air gap 210 onto a collection surface 302 of the inlet port 212. According to an embodiment, the collection surface 302 is a V-shaped extension of the inlet port 212 and is sized to collect much or all of the falling abrasive particles 204. As shown, the collection surface 302 may be held at an angle selected to deflect the abrasive particles 204 toward an inlet port entrance 304. Vacuum produced at the mixing tube (not shown) draws air into the inlet port entrance 304. The inrush of air entrains abrasive particles 204 and also pulls the abrasive particles into the inlet port entrance 304.

Figure 5:
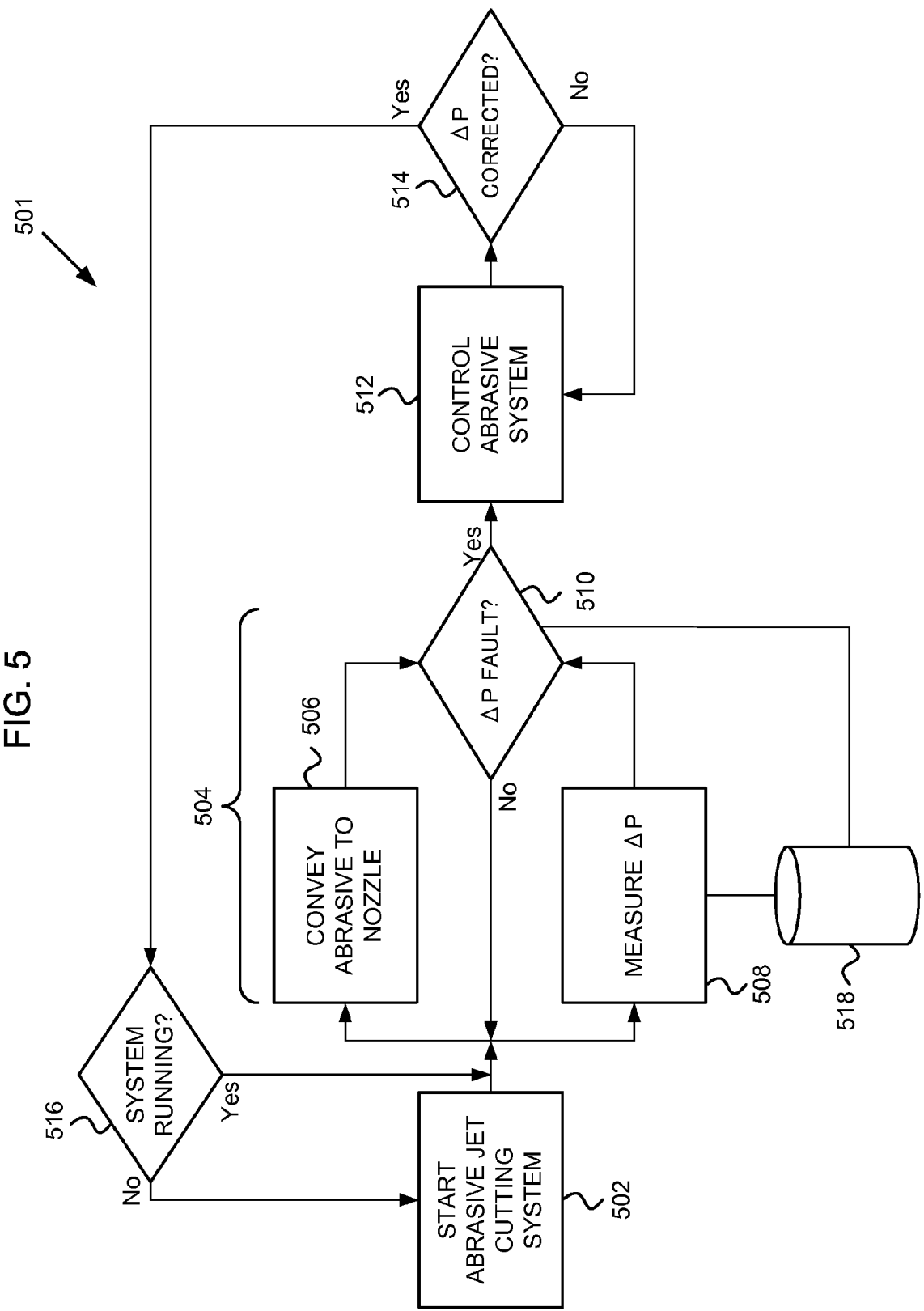
FIG. 5 is a flow chart illustrating operation of an abrasive jet cutting system with a differential pressure abrasive flow measurement, according to an embodiment.

The controller 106 may respond to changes in the differential pressure ΔP in various ways, according to embodiments. FIG. 5 is a flow chart 501 illustrating operation embodiment of an abrasive jet cutting system depicted in the illustrative embodiments of FIGS. 1 and 2. Beginning at step 502, the abrasive jet cutting system, including at least the pump 108 and the abrasive supply system 124, is started. During step 502, a non-steady state may exist in abrasive flow. The differential pressure may therefore fluctuate as steady state abrasive flow is established. During step 502, the controller 106 may ignore the differential pressure ΔP or alternatively apply different set points and/or logic that determine how to respond to changes in differential pressure ΔP.

When start-up 502 is complete, the system progresses to an operation state 504. During the operation state 504, step 506 progresses, wherein abrasive is conveyed to the nozzle 112 through the abrasive supply tube 126. Simultaneously, one or more pumps 108 are operated to provide high pressure fluid to the nozzle 112. The nozzle 112 includes a mixing tube (not shown). The high velocity movement of the fluid jet 114 produces a partial vacuum in the mixing tube. The partial vacuum in the mixing tube (where the output port of the abrasive supply tube 126 is located) creates a pressure differential driving force sufficient to pneumatically convey the abrasive particles from the abrasive input port to the abrasive output port. The abrasive particles become entrained in the high velocity jet 114 in the mixing tube (not shown). Optionally, step 506 may include opening a valve or operating a compressor to provide abrasive conveying air.

In one embodiment, a pressure drop may be detected in step 508 in a state wherein abrasive is not flowing. This detection of the pressure drop may provide information about the condition of the high velocity jet 114 without abrasives, which is information that can be useful to monitor regularly.

Substantially simultaneously in a state wherein abrasive is flowing in step 506, step 508 progresses where the differential pressure ΔP is measured as described elsewhere herein. Optionally, differential pressure ΔP measurement may be accompanied by an average, absolute, or gauge pressure measurement, which may provide additional information about operation of the system, as described above. Proceeding to step 510, the measured differential pressure ΔP is compared to a set point or a range, and the existence or absence of a differential pressure ΔP fault is determined. Optionally, step 510 may also include determination of the existence or absence of an absolute, gauge, or average pressure fault.

As described above, the differential pressure ΔP decreases in response to or when the velocity V decreases corresponding to a reduction in gas flow. Similarly the differential pressure ΔP decreases in response to or when the (variable) coefficient of friction decreases corresponding to a reduction of abrasive in the gas.

If no differential pressure fault exists, the program returns to continue executing steps 506 and 508. The process 504 may continue substantially continuously while the system operates. The method or program 501 may, within the process 504, execute an explicit step 510 at an interval, or may alternatively operate according to interrupt logic. According to embodiments, the process 504 may be at least partly embodied by or in software executed by a processor (such as by the controller 106 or other processor), firmware, and/or hardware.

If a pressure fault is determined to exist in step 510, the program proceeds to step 512 where the system is controlled responsive to the pressure fault. Step 512 may include correction of a problem, and/or may represent providing an alert and/or shutting down at least portions of the abrasive jet cutting system. For example, controlling operation of the abrasive fluid jet cutting system 101 may include at least one of controlling the pump 108 (e.g., shutting off the pump), controlling an abrasive supply system (e.g., stopping the flow of gas to the abrasive supply system or refilling the abrasive hopper 202), controlling the actuation system 116 of the nozzle 112 (e.g., by moving the nozzle 112 to a safe position such as to reduce the possibility of damage to a workpiece 102), and/or controlling an alarm (e.g. outputting an alarm signal via an alarm output 130 to alert a user of the fault condition).

If the differential pressure ΔP fault is corrected, as determined by step 514, the process proceeds to step 516. Step 516 is a decision block that determines whether or not the system is running. For example step 512 may involve refilling the abrasive hopper, modifying an abrasive gas pressure, modifying cutting parameters, or other response that does not involve shutting down the abrasive jet cutting system 101. In the case where the response to the differential pressure fault involves such corrective or adaptive actions, the program 501 may return to the process 504 where operation may continue substantially unimpeded. Alternatively, the system control provided in step 512 may involve shutting down all or a portion of the abrasive jet cutting system 101. If the system is at least partially shut down, the program 501 may proceed from step 516 to step 502, where the system is started up again.

Optionally, step 508 may include writing differential pressure ΔP values, or one or more parameters calculated therefrom, to differential pressure data storage 518. The algorithm to determine the existence of a differential pressure fault used by step 510 may read the differential pressure ΔP values or parameters in the differential pressure data storage 518 to determine the existence or absence of a differential pressure ΔP fault. Values from the differential pressure data storage 518 may be used to determine a differential pressure ΔP set point at which a fault is considered to exist. For example, a progression of smoothly increasing or decreasing differential pressure ΔP values may be attributed to normal wear, a gradual depletion of abrasive particles in a hopper, a change in abrasive grit, or other effects, and the differential pressure fault set point parameter may be modified in the differential pressure data storage 518 to accommodate such normal variations in operating characteristics.

Values from the differential pressure data storage 518 may additionally or alternatively be used to select from among possible control algorithms performed in step 512. For example, a differential pressure ΔP history and/or absolute, gauge, or average pressure history stored in the differential pressure data storage 518 may be used to illuminate the nature of a differential pressure fault. For example, a gradual change in differential pressure ΔP may be indicative of a reduced abrasive flowrate, and a control algorithm executed in step 512 may involve simply alerting a user of a need to adjust the settings for the abrasive flowrate. Alternatively, an abrupt change in differential pressure ΔP may be indicative of a serious malfunction and drive a control algorithm executed in step 512 to perform a system shutdown.

Additionally, the algorithm performed during process 504 may be augmented by information related to other operating parameters of the system. For example, a system shutdown or modification may be delayed until after completion of a cut or a workpiece.

Figure 6:
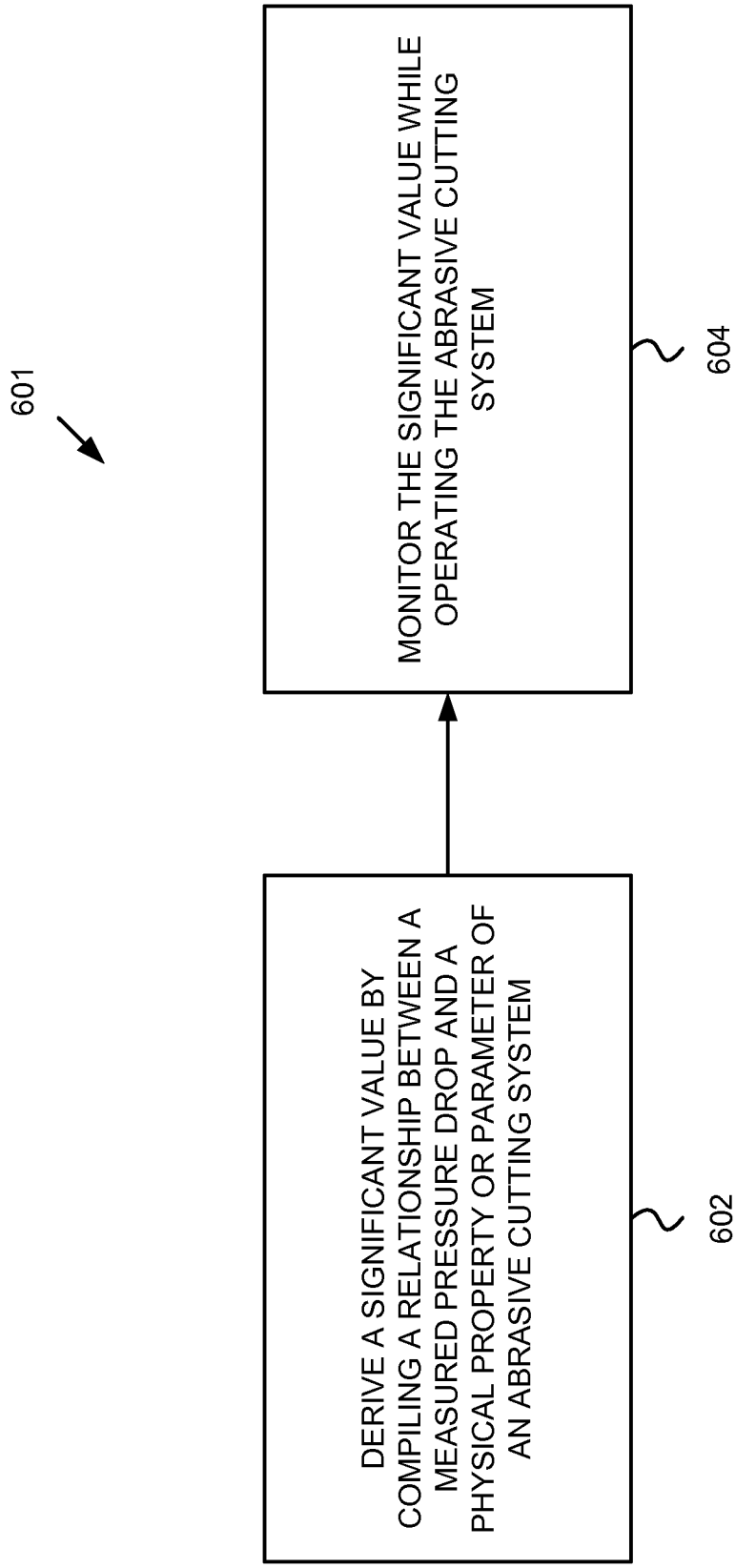
FIG. 6 is a flow chart showing a method 601 for monitoring an abrasive entrainment fluid jet, according to an embodiment.

FIG. 6 is a flow chart showing a method 601 for monitoring an abrasive entrainment fluid jet, according to an embodiment. In step 602, a significant value may be derived by compiling a relationship between a measured pressure drop in an abrasive particle delivery subsystem and at least one physical property or parameter of an abrasive cutting system. For example, deriving the significant value may include compiling a relationship between the measured pressure drop and an abrasive cutting system water pressure. In another example, optionally used in a multivariate relationship along with water pressure, deriving the significant value may include compiling a relationship between the measured pressure drop and an abrasive cutting system orifice diameter or mixing tube diameter.

Proceeding to step 604, the significant value may be monitored while operating the abrasive cutting system 101. Monitoring the significant value may include comparing the significant value with one or more pre-determined constant values to determine the condition of air flow in the abrasive particle subsystem. Such an approach may be applied dynamically. For example, monitoring the significant value while operating the abrasive cutting system may include comparing the significant value with one or more predetermined constant values to determine the condition and changes of the water jet. Additionally or alternatively, monitoring the significant value while operating the abrasive cutting system 101 may include comparing the significant value with the one or more predetermined constant values to determine the condition and changes in abrasive flow rate. For example, this may include comparing the significant value with the one or more predetermined constant values to determine a flow rate of abrasive particles being carried by the entraining air.

The method 601 may also include a step of predetermining constant values for comparison (not shown). The predetermined constant values may be determined in a variety of ways. For example, the method 601 may include determining the one or more predetermined constant values by measuring the significant value at fixed conditions while the abrasive cutting system is operating properly. This can provide a baseline against which the significant value is compared. Alternatively, the predetermined constant value may be calculated from physical properties and parameters of the abrasive cutting system. Similarly, the predetermined constant value may be determined by a combination of calculation from physical properties and parameters of the abrasive cutting system and by measuring the significant value at fixed conditions while the abrasive cutting system is operating properly.

A variety of additional steps may be performed responsive to the monitoring 604. For example, the method 601 may include displaying the monitored significant value and/or a predetermined reference value (not shown). Moreover, the method 601 may include generating a statistical value corresponding to variations in the monitored significant value (not shown). The method 601 may also include analyzing the performance of the abrasive cutting system by comparing monitored significant values or the statistical value corresponding to variations in the monitored significant value against predetermined significant values.

Optionally, the analysis is performed by an abrasive fluid jet controller, such as the controller 106 shown in FIG. 1. Alternatively, the analysis may performed by a computer operatively coupled to the abrasive fluid jet controller via the data interface 104 (FIG. 1). The method 601 may also include actuating an alarm output (not shown) in response to or when the monitored significant value changes by an amount corresponding to an alarm. the alarm may be output via the data interface 104 and/or via an alarm 130 and/or via an alarm signal transmission path 132 (FIG. 1), including electronic messages like email, SMS, and the like.

Optionally, the method 601 may include pausing the abrasive fluid jet cutter at a next convenient point or immediately stopping the abrasive fluid jet cutter (not shown) in response to or when the monitored significant value changes by a corresponding amount.

While the transmission of signals and actions has been described as positive signal transmission, other forms of data or signal transmission may be substituted. For example, referring to FIG. 2, the interface between the sensor module 220 and the controller 106 may be configured as a fail-safe interface where stopping the transmission of data or a signal corresponds to a fault condition. Referring to FIG. 1, similar interfaces may be provided between the controller 106 and other system components such as the pump interface 109, the actuation interface 117 and/or the signal transmission path 132 that interfaces with the alarm output 130 and may involve positive or negative data or signal conditions. Accordingly, transmitting a signal may include sending a signal or ceasing to send a signal.

Although the embodiments described herein may refer with some amount of specificity to an abrasive supply system for an abrasive jet cutting system, the differential pressure measurement method (including a differential pressure measurement fitting that includes no fixed pressure drop constriction) may be applied to the measurement of flow in other pneumatic particle conveyors. For example, solids material handling systems such as used in the cement and concrete industries, food production, and other industries may benefit from the flow measurement described herein.

The descriptions and figures presented herein are necessarily simplified to foster ease of understanding. Other embodiments and approaches may be within the scope of embodiments described herein. Embodiments described herein shall be limited only according to the appended claims, which shall be accorded their broadest valid meaning.

What is claimed is:

1. A method for monitoring an abrasive fluid jet cutting system, comprising:
   providing an abrasive to an abrasive fluid jet nozzle by entraining abrasive particles in air through an abrasive supply tube;
   measuring a differential pressure between at least two points along the abrasive supply tube;
   setting a standard differential pressure; and
   transmitting a control signal in response to the differential pressure deviating from the set standard differential pressure by more than a specified absolute or relative amount.

2. The method for monitoring an abrasive fluid jet cutting system of claim 1, wherein the at least two points include respective pressure measurement ports in one or more fittings disposed in the abrasive supply tube at a specified distance between each other.

3. The method for monitoring an abrasive fluid jet cutting system of claim 1, wherein transmitting the control signal includes sending a signal or ceasing to send a signal.

4. The method for monitoring an abrasive fluid jet cutting system of claim 1, further comprising:
   determining a condition of the flow of the abrasive based at least in part on the measured differential pressure.

5. The method for monitoring an abrasive fluid jet cutting system of claim 1, further comprising:
   measuring an average pressure from at least one of the two points along the abrasive supply tube.

6. The method for monitoring an abrasive fluid jet cutting system of claim 1, further comprising:
   controlling operation of the abrasive fluid jet cutting system responsive to the measured differential pressure, wherein controlling operation of the abrasive fluid jet cutting system includes at least one of controlling a pump and/or controlling an abrasive supply system.

7. The method for monitoring an abrasive fluid jet cutting system of claim 1, wherein the air and entrained abrasive particles flow between the at least two points through a gas flow channel having substantially no flow constriction.

8. The method for monitoring an abrasive fluid jet cutting system of claim 1, wherein measuring a differential pressure between at least two points along the abrasive supply tube includes measuring a differential partial vacuum between the at least two points.

9. The method for monitoring an abrasive fluid jet cutting system of claim 1, wherein the at least two points are at a fixed distance to one another along the abrasive supply tube and a fixed distance to a cutting head.

10. The method for monitoring an abrasive fluid jet cutting system of claim 1, wherein the abrasive supply tube between the at least two points has substantially the same surface properties and diameter as other regions along the abrasive supply tube.

11. The method for monitoring an abrasive fluid jet cutting system of claim 1, wherein the abrasive supply tube between the at least two points differs in at least one of material, shape, surface texture, or form compared to other regions along the abrasive supply tube.

12. The method for monitoring an abrasive fluid jet cutting system of claim 1, wherein the two points along the abrasive supply tube are disposed in physically separate components of the abrasive supply tube.

13. The method for monitoring an abrasive fluid jet cutting system of claim 1, wherein the two points along the abrasive supply tube are disposed in a single physical piece of the abrasive supply tube.

14. The method for monitoring an abrasive fluid jet cutting system of claim 1, wherein measuring a differential pressure between at least two points along the abrasive supply tube further comprises:
   measuring a plurality of differential pressures or partial vacuums between a plurality of pairs of points along the abrasive supply tube.

15. The method for monitoring an abrasive fluid jet cutting system of claim 1, wherein measuring the differential pressure between at least two points along the abrasive supply tube includes receiving pressures from at least two pressure measurement ports formed in the abrasive supply tube at respective different distances between an abrasive entry point and the nozzle.

16. The method for monitoring an abrasive fluid jet cutting system of claim 1, wherein the measured differential pressure is substantially attributable to pressure drop created by air flow between the measurement points and around entrained particles.

17. The method for monitoring an abrasive fluid jet cutting system of claim 1, further comprising:
   determining a condition of the flow of the abrasive based at least in part on the measured differential pressure; and/or
   determining a flow rate of the abrasive based at least in part on the measured differential pressure; and/or
   determining the condition of the jet by measuring the differential pressure without abrasive flow.

18. The method for monitoring an abrasive fluid jet cutting system of claim 1, further comprising:
   measuring an average pressure, absolute pressure, or gauge pressure from at least one of the two points along the abrasive supply tube.

19. The method for monitoring an abrasive fluid jet cutting system of claim 1, further comprising:
   controlling operation of the abrasive fluid jet cutting system responsive to the measured differential pressure.

20. The method for monitoring an abrasive fluid jet cutting system of claim 19, wherein controlling operation of the abrasive fluid jet cutting system includes at least one of controlling a pump, controlling an abrasive supply system, controlling a nozzle actuator, controlling an alarm, and displaying or transmitting a notification.

21. The method for monitoring an abrasive fluid jet cutting system of claim 1, wherein measuring a differential pressure between at least two points along the abrasive supply tube includes measuring a change of partial vacuum between two points in the abrasive supply tube.

22. The method for monitoring an abrasive fluid jet cutting system of claim 1, wherein measuring the differential pressure includes performing the measurement with one differential pressure sensor.

23. The method for monitoring an abrasive fluid jet cutting system of claim 1, wherein measuring the differential pressure includes performing the measurement with two sensors and determining the difference in pressure or partial vacuum between the two sensors.

24. A method for monitoring an abrasive fluid jet cutting system, comprising:
 providing an abrasive to an abrasive fluid jet nozzle by entraining abrasive particles in air through an abrasive supply tube; and
 measuring a differential pressure between at least two points along the abrasive supply tube;
 collecting a temporal series of differential pressure measurements; and
 driving a pressure differential fault determination algorithm according to at least some of the series of differential pressure measurements or at least one parameter corresponding to the at least partial series of differential pressure measurements.

25. The method for monitoring an abrasive fluid jet cutting system of claim 24, further comprising:
 controlling operation of the abrasive fluid jet cutting system responsive to the measured differential pressure, wherein controlling operation of the abrasive fluid jet cutting system includes at least one of controlling a pump and/or controlling an abrasive supply system.

26. The method for monitoring an abrasive fluid jet cutting system of claim 24, wherein measuring the differential pressure between at least two points along the abrasive supply tube includes receiving pressures from at least two pressure measurement ports formed in the abrasive supply tube at respective different distances between an abrasive entry point and the nozzle.

27. The method for monitoring an abrasive fluid jet cutting system of claim 24, wherein the measured differential pressure is substantially attributable to pressure drop created by air flow between the measurement points and around entrained particles.

28. The method for monitoring an abrasive fluid jet cutting system of claim 24, further comprising:
 determining a condition of the flow of the abrasive based at least in part on the measured differential pressure; and/or
 determining a flow rate of the abrasive based at least in part on the measured differential pressure; and/or
 determining the condition of the jet by measuring the differential pressure without abrasive flow.

29. The method for monitoring an abrasive fluid jet cutting system of claim 24, further comprising:
 measuring an average pressure, absolute pressure, or gauge pressure from at least one of the two points along the abrasive supply tube.

30. The method for monitoring an abrasive fluid jet cutting system of claim 24, further comprising:
 controlling operation of the abrasive fluid jet cutting system responsive to the measured differential pressure.

31. The method for monitoring an abrasive fluid jet cutting system of claim 30, wherein controlling operation of the abrasive fluid jet cutting system includes at least one of controlling a pump, controlling an abrasive supply system, controlling a nozzle actuator, controlling an alarm, and displaying or transmitting a notification.

32. The method for monitoring an abrasive fluid jet cutting system of claim 24, wherein measuring a differential pressure between at least two points along the abrasive supply tube includes measuring a change of partial vacuum between two points in the abrasive supply tube.

33. The method for monitoring an abrasive fluid jet cutting system of claim 24, wherein measuring the differential pressure includes performing the measurement with one differential pressure sensor.

34. The method for monitoring an abrasive fluid jet cutting system of claim 24, wherein measuring the differential pressure includes performing the measurement with two sensors and determining the difference in pressure or partial vacuum between the two sensors.

35. A particle conveyor, comprising:
 a particle inlet port;
 a particle outlet port configured to be drawn to a partial vacuum;
 a particle supply tube configured to pneumatically convey particles from the particle inlet port to the particle outlet port, the particle supply tube including at least two measurement ports at different distances along the particle supply tube having no flow constriction between the at least two measurement ports;
 a differential pressure transducer coupled to the at least two measurement ports and configured to measure a differential pneumatic pressure between the at least two measurement ports, wherein the differential pressure transducer comprises:
  two or more absolute or gauge pressure transducers operatively coupled to respective measurement ports; and
  a pressure comparison circuit operatively coupled to the two or more absolute or gauge pressure transducers and configured to determine the differential pressure from the two or more absolute or gauge pressures; and
 a controller operatively coupled to the differential pressure transducer and configured to determine one or more particle flow parameters responsive to the differential pneumatic pressure.

36. The particle conveyor of claim 35, wherein the particle conveyor comprises an abrasive supply system for an abrasive jet cutting system and the particles are abrasive particles; and further comprising:
 a fluid jet nozzle including a mixing tube configured to draw the partial vacuum and entrain the abrasive particles in a high velocity fluid jet in response to the fluid jet nozzle being pressurized.

37. The particle conveyor of claim 35, wherein the particle inlet port is held substantially at atmospheric pressure.

38. The particle conveyor of claim 35, further comprising a fitting forming a portion of the particle supply tube, the fitting including a wall defining an entrained particle flow channel, and having at least two measurement ports separated by a length along the entrained particle flow channel.

39. The particle conveyor of claim 38, wherein a differential pressure between the at least two measurement ports is proportional to a pressure drop caused by flow of air around and past entrained particles in the entrained particle flow channel between the at least two measurement ports.

40. The particle conveyor of claim 38, wherein the at least two measurement ports are at non-right angles relative to the entrained particle flow channel to reduce or eliminate particles entering the measurement ports.

41. The particle conveyor of claim 35, wherein the controller is configured to operate using electrical, pneumatic, or electrical and pneumatic control logic.

42. The particle conveyor of claim 35, wherein the particle supply tube between the at least two points has substantially the same surface properties and diameter as other regions along the particle supply tube.

43. The particle conveyor of claim 35, wherein the particle supply tube between the at least two points differs in at least one of material, shape, surface texture, or form compared to other regions along the particle supply tube.

44. A particle conveyor, comprising:
a particle inlet port;
a particle outlet port configured to be drawn to a partial vacuum;
a particle supply tube configured to pneumatically convey particles from the particle inlet port to the particle outlet port, the particle supply tube including at least two measurement ports at different distances along the particle supply tube having no flow constriction between the at least two measurement ports;
a differential pressure transducer coupled to the at least two measurement ports and configured to measure a differential pneumatic pressure between the at least two measurement ports; and
a controller operatively coupled to the differential pressure transducer and configured to determine one or more particle flow parameters responsive to the differential pneumatic pressure;
wherein the one or more particle flow parameters includes one or more of nominal particle flow, a low concentration of entrained particles, or a blockage in particle flow.

45. The particle conveyor of claim 44, wherein the particle inlet port is held substantially at atmospheric pressure.

46. The particle conveyor of claim 44, wherein a differential pressure between the at least two measurement ports is proportional to a pressure drop caused by flow of air around and past entrained particles in the particle supply tube between the at least two measurement ports.

47. The particle conveyor of claim 44, wherein the at least two measurement ports are at non-right angles relative to the particle supply tube to reduce or eliminate particles entering the measurement ports.

48. The particle conveyor of claim 44, wherein the controller is configured to respond if the differential pressure transducer indicates a decrease in differential pneumatic pressure below a low pressure value or an increase in differential pneumatic pressure above a high pressure value.

49. A particle conveyor comprising an abrasive supply system for an abrasive jet cutting system, wherein the particles are abrasive particles, the particle conveyor comprising:
a particle inlet port;
a particle outlet port configured to be drawn to a partial vacuum;
a particle supply tube configured to pneumatically convey particles from the particle inlet port to the particle outlet port, the particle supply tube including at least two measurement ports at different distances along the particle supply tube having no flow constriction between the at least two measurement ports;
a differential pressure transducer coupled to the at least two measurement ports and configured to measure a differential pneumatic pressure between the at least two measurement ports;
a controller operatively coupled to the differential pressure transducer and configured to determine one or more particle flow parameters responsive to the differential pneumatic pressure;
wherein the controller is configured to ignore the differential pneumatic pressure or apply a different response to the differential pneumatic pressure during start-up;
a fluid jet nozzle including a mixing tube configured to draw the partial vacuum and entrain the abrasive particles in a high velocity fluid jet in response to the fluid jet nozzle being pressurized; and
wherein the controller is configured to control at least one selected from the group consisting of a supply of fluid to the fluid jet nozzle, movement of the fluid jet nozzle, operation of the abrasive supply system, and providing an alarm responsive to determining the one or more particle flow parameters.

50. The particle conveyor of claim 49, wherein the controller is configured to respond if the differential pressure transducer indicates a decrease in differential pneumatic pressure below a low pressure value or an increase in differential pneumatic pressure above a high pressure value.

51. The particle conveyor of claim 50, wherein the differential pneumatic pressure value or values is determined at least in part responsive to one or more previously measured differential pneumatic pressures.

* * * * *